United States Patent [19]

Ueda et al.

[11] 4,241,110
[45] Dec. 23, 1980

[54] METHOD OF MANUFACTURING ROTOR BLADE

[75] Inventors: Masato Ueda, Nagasaki; Takeshi Andoh, Isahaya, both of Japan

[73] Assignee: Mitsubishi Jukogyo Kabushiki Kaisha, Tokyo, Japan

[21] Appl. No.: 41,413

[22] Filed: May 22, 1979

[30] Foreign Application Priority Data

Jul. 20, 1978 [JP] Japan .................................. 53-87738

[51] Int. Cl.³ .......................... B05D 1/06; B05D 1/02
[52] U.S. Cl. ............................... 427/203; 29/156.8 R; 29/156.8 B; 416/241 R; 416/241 B; 427/204; 427/421; 427/423; 427/419.7
[58] Field of Search ................. 427/34, 423, 421, 204, 427/203, 419 F; 428/627, 939, 564; 29/156.8 R, 156.8 B; 416/241 R, 241 B

[56] References Cited

U.S. PATENT DOCUMENTS

| | | | |
|---|---|---|---|
| 2,339,208 | 1/1944 | Van Der Pyl | 428/564 X |
| 2,783,966 | 3/1957 | Sorensen | 416/229 |
| 3,017,689 | 1/1962 | Link et al. | 428/937 X |
| 3,054,694 | 9/1962 | Aves | 428/937 X |
| 3,117,845 | 1/1964 | Reed | 428/937 X |
| 3,166,295 | 1/1965 | Szewalski et al. | 29/156.8 B |
| 3,215,511 | 11/1965 | Chisholm et al. | 428/564 |
| 3,353,932 | 11/1967 | Shanley | 428/937 X |
| 3,758,233 | 9/1973 | Cross et al. | 416/229 |
| 3,814,447 | 6/1974 | Prasse et al. | 428/937 X |
| 4,013,453 | 3/1977 | Patel | 427/423 X |

*Primary Examiner*—Shrive P. Beck
*Attorney, Agent, or Firm*—Sherman Levy

[57] ABSTRACT

A rotor blade is manufactured by making a soft alloy into a blade body with a curved section, joining a hard alloy to the leading edge of the blade body, coating the back side surfaces of the leading and trailing edge portions of the blade by alternately giving at least one coat each of a Ni-Cr-B-Si alloy and WC by spraying and fusing the coats onto the backing surfaces, and then coating the entire front side surface of the blade in the same way.

5 Claims, 11 Drawing Figures

METHOD OF MANUFACTURING ROTOR BLADE

This invention relates to a method of manufacturing a rotor blade, and more specifically to such a method whereby the impact erosion of the blade due to impingement of fine solid particles thereon during high speed operation is prevented.

Generally, high speed rotor blades for fans, made of iron-base alloys having good machinability and castability, erode and wear away at edges as fine solids in a fluid impinge against or slide over the metal surface, reducing the capacity and performance of the fans.

FIG. 1 shows one side of such a blade of an axial fan for stack gas discharge from a coal thermal power station, eroded after several months of service. In the figure, 1 is the blade body, 2 is the hub, 3 is the eroded leading edge (i.e., the edge along which a fluid enters the sphere of blade action, the same applying hereinafter), and 4 is the eroded trailing edge (i.e., the edge along which the fluid leaves).

As will be obvious from FIG. 2, which looks in the direction of the arrows A—A of FIG. 1, the rotation of the blade causes minute suspended solids in the fluid to impinge on the leading edge, slide past the edge and along the both sides, and leave the trailing edge of the blade. This impingement is accompanied with the erosion attack.

The present invention has for its object to provide a method of manufacturing a rotor blade which is protected against the impact erosion due to impingement of fine solids during high speed operation.

This invention has resulted from an intense search for a method of hardening the surfaces of blades for exhaust fans to meet the requirements for longer blade life with the growth in number of coal thermal power stations under construction and in operation. The invention resides, in essence, in a method of manufacturing a rotor blade which comprises making a soft alloy into a blade body with a curved section, joining a hard alloy to the leading edge of the blade body, coating the back side surfaces of the leading and trailing edge portions of the blade by alternately giving at least one coat each of a Ni-Cr-B-Si alloy and WC by spraying and then fusing the coats onto the backing surfaces, and thereafter coating the entire front side surface of the blade by repeating the above coating procedure.

In accordance with the invention, the ordinary rotor blade of a hard alloy having a curved section which is difficult to fabricate is replaced by a blade consisting of a blade body of a soft alloy which is easier to handle, with a coating of a hard alloy on the surface. In addition, a separate leading edge of a hard alloy is united to the blade, because, as shown in FIGS. 1 and 2, the ordinary leading edge is particularly susceptible to erosion and the coating alone is unable to withstand the attack.

In practice of the invention, the soft alloy to be made into the blade body is an iron-base alloy with superior machinability and castability in common use for the manufacture of rotor blades. Examples of such alloys include cast steel, cast iron, and carbon steel. The hard alloy to be joined or welded by the buildup technique to the leading edge is an alloy harder than the soft alloy forming the blade body, e.g., a Co-W-Cr alloy, Cr-Mn-C alloy, or high-carbon alloy steel.

Also, under the invention, the Ni-Cr-B-Si alloy to provide a coating on the back side surfaces of the leading and trailing edge portions and on the entire front side surface of the blade by spraying and fusion treatments may be of a composition consisting of Cr 5-25%, B 1-4%, Si 1.5-4.5%, C 0.15-1.5%, Fe <5%, Co <1%, Mo <4%, Cu <4%, and the balance Ni. This Ni-Cr-B-Si alloy and WC are alternately sprayed to give coats and fused together in order to produce a uniform lamination of the alloy and WC. If the two materials are mixed before spraying and fusion, segregation of WC in the coating will result because of its heavier specific gravity.

The reason for which the spraying is followed by the fusion treatment is that the mere spraying of the Ni-Cr-B-Si alloy and WC will allow the both to cling only mechanically to the blade surface and that the subsequent fusion treatment melts the Ni-Cr-B-Si alloy of a lower melting point, enabling the WC of a higher melting point to adhere solidly to the backing surface.

The spraying and fusion treatments are first done on the back side (i.e., on the convex side of the blade with a curved section, the same applying hereinafter) and then on the front side (i.e., on the concave side of the curved blade, the same applying hereinafter) to minimize the deformation due to shrinkage stresses of the Ni-Cr-B-Si alloy. If the order is reversed and the front side is treated first, such intense shrinkage stresses that reduce the radius of the concave will develop. In contrast with the back side, the front side is coated over the entire surface with the Ni-Cr-B-Si alloy and WC by spraying and fusion, because the rotor blade runs with the front side facing the rotational direction and naturally the suspended solids in the fluid mostly slide along the front side, attacking the surface by abrasion.

The present invention is applicable to all of high speed rotor blades for induced- and forced-draft fans and the like as well as for exhaust fans.

The above and other objects, features, and advantages of the invention will become more apparent from the following description taken in conjunction with the accompanying drawings, in which.

Figure 1:
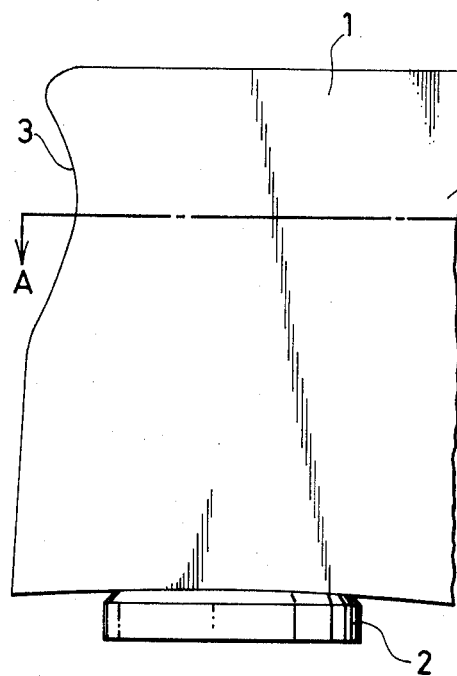
FIG. 1 is a side view of an exhaust axial fan in common use at coat-fired stations, showing eroded conditions after several months of service.
Figure 3:
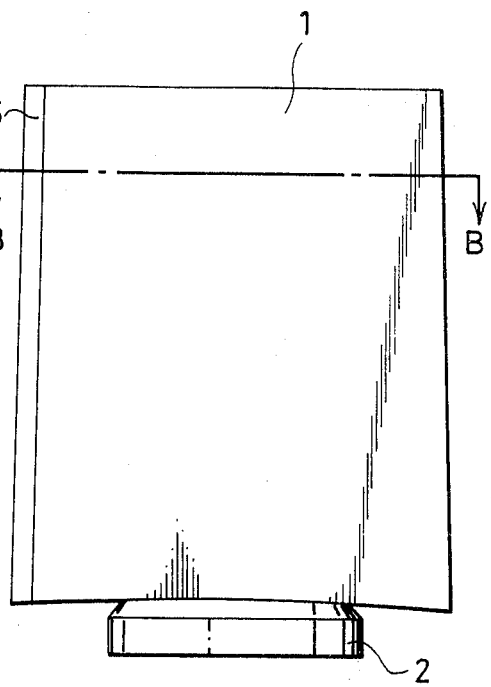
Figure 2:
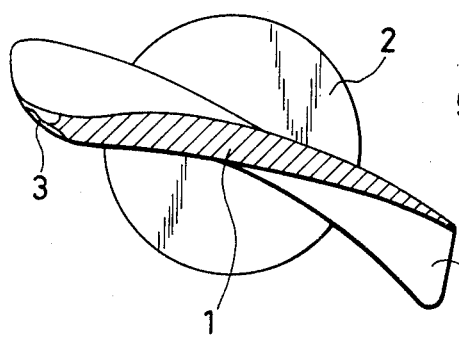
FIG. 2 is a view looking in the direction of arrows A—A of FIG. 1.
Figure 4:
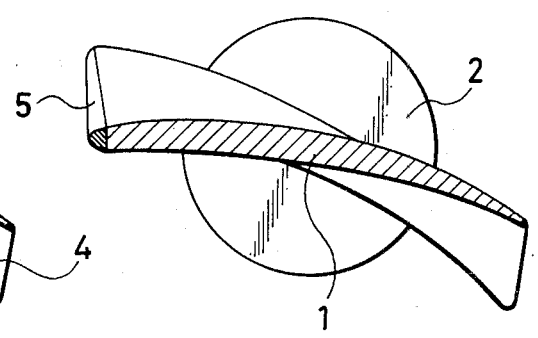
Figure 5:
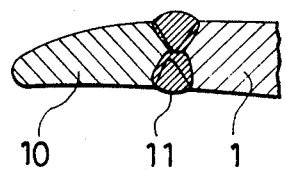
Figure 6:
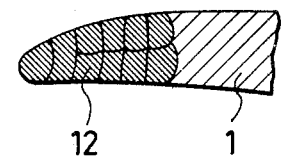
Figure 7:
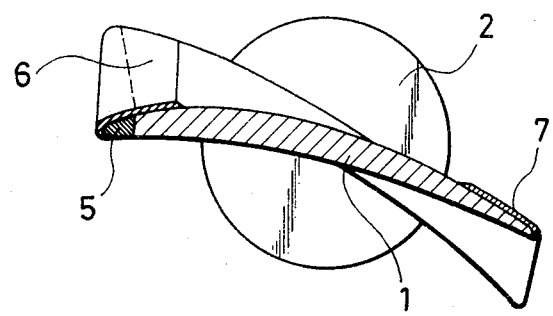
Figure 8:
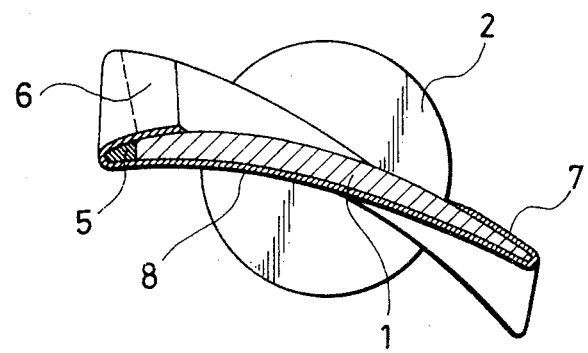
Figure 9:
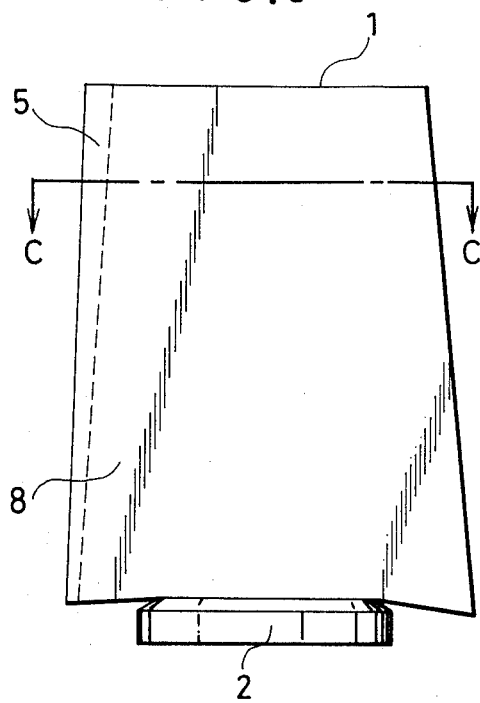
Figure 10:
Figure 11:
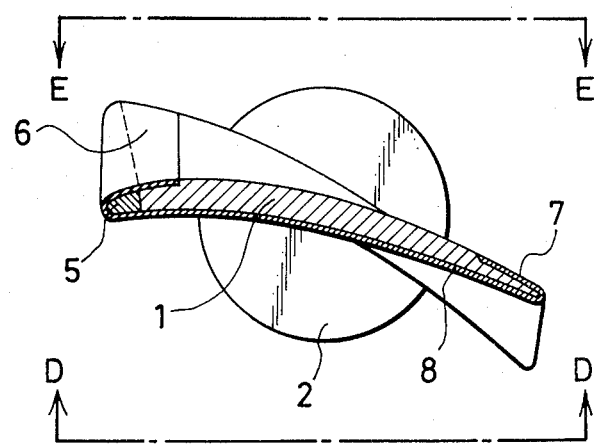

FIGS. 3 through 8 are sequential views illustrating the manufacture of a rotor blade according to the method of the invention, FIG. 3 being a side view of a rotor blade, FIG. 4 a view looking in the direction of arrows B—B of FIG. 3, FIGS. 5 and 6 fragmentary sectional views of the leading edge portion of the rotor blade, and FIGS. 7 and 8 transverse plan views of the blade in different stages of fabrication; and FIGS. 9 to 11 are views of a high speed rotor blade for an exhaust fan made for comparison purpose in accordance with the method of the invention, FIG. 9 being a side elevation of the front side of the backwardly curved blade as viewed in the direction of arrows D—D of FIG. 11, FIG. 10 a side elevation of the back side as viewed in the direction of arrows E—E of FIG. 11, and FIG. 11 a view looking in the direction of arrows C—C of FIG. 9.

Referring to FIG. 3, a rotor blade is shown in side elevation, with its leading edge formed of a hard alloy united to the blade by joining or buildup welding in the usual manner. The numeral 1 designates a blade body made of a soft alloy; 2, a hub; and 5, the hard alloy joined or buildup welded to the blade body.

FIG. 4 is another view of the blade seen in the direction of arrows B—B of FIG. 3. The hub 2 is made of the same material as the blade body 1.

FIG. 5 is a typical representation of the leading edge of the blade where the hard alloy is welded to the blade body. The numeral 10 indicates the hard alloy, 11 the weld, and 1 the blade body.

FIG. 6 typically shows another form of the leading edge formed by buildup welding of the hard alloy as a buildup or pad 12 to the body 1.

The rotor blade with the leading edge joined or welded by buildup techniques as above is then coated, on the back surfaces of the leading edge portion including the entire hard alloy area and of the trailing edge portion, with at least one coat each of a Ni-Cr-B-Si alloy and WC by alternate spraying with a subsequent fusion treatment. When a thick coating is to be had, this procedure is repeated the number of times required to attain the desired thickness. The spraying and fusion treatments are accomplished in the following way. First, the surface to be treated is cleaned by grid blasting or the like, and powders of a Ni-Cr-B-Si alloy and WC, fed in succession into and melted or heated, e.g., by an oxyacetylene flame, are sprayed over the surface at the combustion velocity of the flame. (This treatment is called "spraying" for the purposes of the invention.) As sprayed, the Ni-Cr-B-Si alloy and WC particles are merely mechanically bonded together with a limited strength of adhesion to the surface. For a greater joining strength the coats formed by spraying are heated, e.g., by an oxyacetylene flame up to the melting point of the alloy to fuse the particles solidly onto the surface. (This is called "fusion".)

FIG. 7 is a transversely sectional plan view of a blade including the leading and trailing edge portions thus coated with a hard surface layer on the back side. In the figure, 1 is the blade body, 2 is the hub, 5 is the hard alloy constituting the leading edge, 6 is the hard surface coating formed by the spraying and fusion of the Ni-Cr-B-Si alloy and WC on the curved back edge portion including the leading edge, and 7 is the hard surface coating formed in the same way as above on the curved back edge portion including the trailing edge.

After the hard surface coatings 7 and 8 have been formed in the manner described, the entire surface of the front side of the rotor blade is given at least one coat each of the Ni-Cr-B-Si alloy and WC by alternate spraying with subsequent fusion treatment for ultimate coating in the same way as with the back side. This procedure may be repeated a plurality of times until a coating of a desired thickness is produced.

FIG. 8 is a view similar to FIG. 7 but showing the entire surface of the front side protected with the same hard surface coating as above described. Throughout these figures like numerals designate like parts, 8 indicating the coating formed by spraying and fusing the Ni-Cr-B-Si alloy and WC for surface hardening on the front side of the curved blade.

The advantageous effects of the method according to the invention are illustrated by the following example.

A blade was manufactured in the manner as shown in FIGS. 9 to 11 in accordance with the method of the invention for use with an exhaust fan of a thermal power station, and its life was compared with those of conventional blades of plain cast steel and ductile cast iron. The results were as follows:

Plain cast steel blade: 4 months
Ductile cast iron blade: 6 months
Blade of the invention: 32 months The following conditions were used for the test blade operation:

Number of revolutions: $n \approx 3900$ r.p.m.
Quantity of air handled: $Q \approx 300$ m$^3$/min
Fly ash concentration: $\approx 5$ g/m$^3$

What is claimed is:

1. A method of manufacturing a rotor blade having a leading edge and a trailing edge and said edges are connected by a curved body having a convex back side and a concave front side which comprises:
   making a soft iron-base alloy with good machinability and castability into said blade body with said curved configuration;
   joining a hard alloy to the leading edge of said blade body;
   providing a coating only on the leading edge and trailing edge surfaces of the convex back side of said blade body; and
   thereafter coating the entire surface of the concave front side of said blade body;
   said coatings being provided by first spraying a coating consisting essentially of a Ni-Cr-B-Si alloy onto said surfaces and then spraying a coating consisting essentially of tungsten carbide onto the deposit formed when said Ni-Cr-B-Si is sprayed onto said surfaces and then fusing said coatings onto said surfaces.

2. A method according to claim 1 wherein the steps of spraying said coatings on said surfaces and fusing the same are repeated for a plurality of times in order to increase the thickness of the coatings.

3. A method according to claim 1, wherein said hard alloy to be joined to the leading edge of said blade body is a Co-W-Cr alloy, Cr-Mn-C alloy, or high carbon alloy steel.

4. A method as defined claim 1, wherein said Ni-Cr-B-Si alloy to be sprayed and fused onto said blade surfaces to provide a coating is of a composition consisting of Cr 5–25%, B 1–4%, Si 1.5–4.5%, C 0.15–1.5%, Fe <5%, Co <1%, Mo <4%, Cu <4%, and the balance Ni.

5. A method according to claim 1, wherein said hard alloy is joined to the leading edge of said blade body by plain welding or buildup welding.

* * * * *